United States Patent Office 2,941,946
Patented June 21, 1960

2,941,946
METHOD OF MAKING AN ELECTROLYTE

Sidney D. Ross, Walter J. Bernard and Moushy Markarian, Williamstown, Mass., assignors to Sprague Electric Company, North Adams, Mass., a corporation of Massachusetts No Drawing. Filed June 4, 1958, Ser. No. 739,672

2 Claims. (Cl. 252—62.2)

This invention relates to a method of producing an essentially nonaqueous electrolyte for an electrolytic capacitor and more particularly to producing an electrolyte of a lower aliphatic amine salt in a lower aliphatic alcohol solvent.

In an electrolytic capacitor an electrolyte should be substantially uniform in electrical properties. The electrolyte for incorporation in a series of electrolytic capacitors must have consistently reproducible electrical properties to permit the production of a number of capacitors containing electrolytes having standard and uniform characteristics. Some of these desirable and consistently reproducible electrical properties of the electrolyte include its resistivity, its shelf life, its low temperature operating characteristics, its ability to form a dielectric oxide on a capacitor anode at relatively high voltages, its volatility and consistency of behavior in operation. Particularly desirable are electrolytes which form a dielectric oxide film on a capacitor anode by anodic treatment in the electrolyte at relatively high voltages, that is, of the order of 200 volts. At the same time, the electrolyte should exhibit low resistivity in the capacitor and low volatility or gas formation and finally, it has been discovered that an electrolyte of an alkaline pH has good low temperature operating characteristics.

These properties are achieved with an electrolyte composed of a solution of a lower aliphatic amine salt in a lower aliphatic alcohol solvent containing a limited amount of water as described in our U.S. application S.N. 674,767, filed July 29, 1957, of which this application is a continuation-in-part. The lower aliphatic amine salt in the solution at a pH of about 8 to 9 and in association with from about ¼ to 2½% of water based on the weight of the solution results in an electrolyte having highly desirable electrical properties for electrolytic capacitor processes. For example, such an electrolyte enables the formation of a dielectric oxide film on a capacitor anode by anodic treatment in the electrolyte at a voltage of the order of 200 volts. The alkaline solution provides uniform operating characteristics at low temperatures and relatively long life. Further, the electrolyte is desirable in having low resistivity, for example, specific resistivities of less than 500 ohms-centimeters and even substantially less as, for example, specific resistivities of less than 250 ohms-centimeters. To satisfactorily reproduce the electrolyte having these desirable properties for electrolytic capacitor purposes, it is necessary to consistently reproduce a solution of the lower aliphatic amine salt of a lower aliphatic carboxylic acid in the solvent with about ¼ to 2½% water in the solution and a pH of from about 8 to 9 and an absence of a side-reaction product.

It is an object of this invention to provide an improvement in the preparation of an amine salt in a solvent as a capacitor electrolyte to result in a product of consistent, desirable electrical properties.

It is a further object of this invention to provide a method of preparing an amine salt in a solvent as an electrolyte having good oxide formation characteristics, low resistivity and low volatility.

These and other objects of this invention will become more apparent upon consideration of the following description.

The present invention provides the preparation of an amine salt in a solvent by the formation of the salt without side reactions and without the formation of an amide so that the proportion of the salt to the water in the solution results in certain desirable and reproducible electrical properties. The resultant electrolyte prepared by this method contains only the lower aliphatic amine salt in solution. As a result the final salt concentration in the solution is that of the total amount of salt which may be formed by the reaction of an amine and an acid. Further, it has been discovered that this method of preparation results in the consistent reproduction of the desirable electrical properties in the amine salt in the solvent.

The electrolyte of a solute of a lower aliphatic amine salt in a lower aliphatic alcohol solvent may be produced by the solution of the isolated salt in a solvent such as glycol. It is preferable to produce the electrolyte by reacting the components of the salt in the solvent to produce the solute. It has been found, however, that the addition of an amine to a solution of trifluoroacetic acid in ethylene glycol, for example, does not result in a consistently reproducible electrolyte of ethanolamine trifluoroacetate in the glycol solvent. This apparent non-reproducibility of the essential properties is a serious disadvantage to the electrolyte. Apparently, an electrolyte of satisfactory electrical properties can be consistently reproduced by the solution of the isolated salt in the solvent. Production of the electrolyte by means of dissolving the isolated salt in the solvent is disadvantageous, as the additional operations required make it impractical to use a prepared salt. On the other hand, the preparation of the solute by adding amine to a solution of the acid in the solvent apparently results in side reactions which minimize and defeat the electrical properties of the electrolyte and result in an electrolyte which is non-reproducible insofar as electrical properties are concerned.

It has been discovered that lower aliphatic amine salt in the lower aliphatic alcohol solvent can be produced by a reaction of the salt components to result in the production of the desired product. A satisfactory method of consistently producing the salt in the solvent requires the absence of by-products such as an amide or excessive additional water. The preparation of the electrolyte by first mixing the carboxylic acid and the lower aliphatic alcohol solvent with the subsequent addition of the lower aliphatic amine results in a product including the amide and additional water formed in the reaction. Further, the proportion of salt produced is consequently reduced.

In accordance with the most advantageous application of this invention the solute of the electrolyte is produced by adding to a lower aliphatic alcohol solvent such as ethylene glycol an amine such as ethanolamine. In this basic solution there is no esterification. To this mixture of ethanolamine and ethylene glycol a pure trifluoroacetic acid is added. Again no esterification of the trifluoroacetic acid takes place. In the absence of the ester the amine salt is formed without amide formation. The only reaction which takes place is the formation of the amine salt according to the following equation:

$$HOCH_2CH_2NH_2 + CF_3COOH \rightarrow [HOCH_2CH_2NH_3] + [CF_3COO-]$$

The invention will be further illustrated by the following examples but is not limited thereto.

Example I

Ethylene glycol in an amount of 5081 cc. was measured into a 12 liter 3-neck flask and equipped with a stirrer, a dropping funnel and a thermometer. A portion of the ethanolamine in the amount of 1946 cc. was added to the ethylene glycol portion by dropping through the funnel and rapidly adding with stirring. Following the addition of the ethanolamine a portion of the trifluoroacetic acid in the amount of 2400 cc. was added slowly and with external cooling of the flask to maintain the reaction temperature below 45° C. as indicated on the thermometer. Upon addition of all of the acid portion a pH meter probe was immersed in the solution to determine the pH and the pH of the mixture was adjusted to a pH of 8.6 by the addition of additional ethanolamine. Water in a percentage of 1% of the total weight of the reactants was then added to the mixture.

The resultant finished electrolyte product was determined to have a resistivity of 210 ohms-centimeters.

Example II

Ethylene glycol in an amount of 5060 cc. was measured into a 12-liter, 3-neck flask and equipped with a stirrer, a dropping funnel and a thermometer. A portion of the ethanolamine in the amount of 2800 cc. was added to the ethylene glycol portion by dropping through the funnel and rapidly adding with stirring. Following the addition of the ethanolamine a portion of glacial acetic acid in the amount of 2660 cc. was added slowly and with external cooling of the flask to maintain the reaction temperature below 45° C. as indicated on the thermometer. Upon addition of all of the acid portion a pH meter probe was immersed in the solution to determine the pH and the pH of the mixture was adjusted to a pH of 8.6 by the addition of additional ethanolamine. Water in a percentage of 1% of the total weight of the reactants was then added to the mixture.

The resultant finished electrolyte product was determined to have a resistivity of 467 ohms-centimeters.

The method of the invention as exemplified by the examples produces a salt solute in a solvent with the absence of an amide and the presence of only a specified critical amount of water in a range from ¼ to 2½% of the total weight of the solution. The production of the salt cannot be carried out by processes which lead to esterification and the production of aliphatic acid esters in the solution such as esters will react with the amine to produce amide, and this results in different or unreliable electrical properties in the electrolyte. For example, in a process in which the trifluoroacetic acid is first dissolved in ethylene glycol at room temperature the reaction of these reactants will result in the production of significant amounts of trifluoroacetate esters. The lower aliphatic amine salt may subsequently be produced in this solution by the addition of an amine such as ethanolamine. However, when ethanolamine is added to the solution containing the trifluoroacetic acid as well as the acetate esters two reactions are found to take place. First there is the desired salt formation by the reaction between the acid present in the solution. Ethanolammonium trifluoroacetate is the product of this reaction. However, upon the exhaustion of the free acid by this reaction the previously formed esters in the solution will be subject to an aminolysis, and an amide will be formed. Thus, there is produced the N-B-hydroxyethyl trifluoroacetamide. This means that part of the amine and acid reactants result in a production of the amide. The resultant electrolyte product has different electrical properties than would be present with the ethanolammonium trifluoroacetate in the electrolyte alone.

This difficulty is not present in the process of the invention where there is no possibility of esterification in the basic solution. No esterification takes place upon addition of the pure aliphatic carboxylic acid to the previously prepared amine glycol solution and the only reaction is salt formation. Additional advantages of the alkaline electrolyte are the uniform operating characteristics at low temperatures and its shelf life. Further, the process of the invention results in a product having water in the critical range which enables the formation of the dielectric oxide film at up to 200 volts. Further, the final salt concentration is the one calculated for the reactant components and is not lowered by the formation of amide.

This invention has been described as applied particularly to the production of an electrolyte of ethanolammonium trifluoroacetate or ethanolammonium trifluoroacetate or ethanolammonium acetate in ethylene glycol. It is applicable also to other electrolytes of the group of aliphatic amine salts in lower aliphatic alcohol solvents. Accordingly, it is intended that the scope of this invention be limited only by the following claims.

What is claimed is:

1. A process for preparing an electrolytic capacitor electrolyte consisting of a lower alkyl amine salt in ethylene glycol, said process comprising mixing a lower alkyl amine and ethylene glycol solvent, subsequently adding a halogenated acetic acid in an amount stoichiometrically equivalent to the amine in the solution to provide a concentration of 40% to 60% by weight of solute in the solvent, maintaining the reaction temperature below 45° C. during said addition, thereby forming an alkyl amine salt of the halogenated acetic acid in ethylene glycol with the absence of formation of esters or amides, then adjusting the pH to between 8 and 9 by the addition of amine, and adding water to provide a water content of between 0.25% and 2.5% by weight.

2. A process as claimed in claim 1 in which ethanolamine is mixed in ethylene glycol and subsequently trifluoroacetic acid is added to the mixture to form ethanolammonium trifluoroacetate in ethylene glycol.

References Cited in the file of this patent

UNITED STATES PATENTS

| | | |
|---|---|---|
| 1,973,602 | Bergstein | Sept. 11, 1934 |
| 2,036,669 | Yngve | Apr. 7, 1936 |
| 2,198,494 | Georgiev | Apr. 23, 1940 |
| 2,227,146 | Linder | Dec. 31, 1940 |
| 2,264,899 | Georgiev | Dec. 2, 1941 |
| 2,868,833 | Szabo et al. | Jan. 13, 1959 |

UNITED STATES PATENT OFFICE
CERTIFICATE OF CORRECTION

Patent No. 2,941,946            June 21, 1960

Sidney D. Ross et al.

It is hereby certified that error appears in the printed specification of the above numbered patent requiring correction and that the said Letters Patent should read as corrected below.

Column 2, lines 68 and 69, the equation should appear as shown below instead of as in the patent:

$$HOCH_2CH_2NH_2 + CF_3COOH \longrightarrow [HOCH_2CH_2NH_3^+] + [CF_3COO^-]$$

Signed and sealed this 13th day of December 1960.

(SEAL)
Attest:

KARL H. AXLINE            ROBERT C. WATSON
Attesting Officer            Commissioner of Patents